(12) United States Patent
Bakowski

(10) Patent No.: US 7,497,048 B2
(45) Date of Patent: Mar. 3, 2009

(54) STOWABLE PLANT PROTECTOR

(76) Inventor: Steven M. Bakowski, 5640 Davison Rd., Clarence, NY (US) 14031

( * ) Notice: Subject to any disclaimer, the term of this patent is extended or adjusted under 35 U.S.C. 154(b) by 407 days.

(21) Appl. No.: 11/244,810

(22) Filed: Oct. 6, 2005

(65) Prior Publication Data

US 2007/0079548 A1    Apr. 12, 2007

(51) Int. Cl.
*A01G 13/00* (2006.01)
*A01G 13/02* (2006.01)
*E04H 15/18* (2006.01)

(52) U.S. Cl. .............................. 47/31; 47/20.1; 47/29.1; 47/29.6; 135/97; 135/115; 135/119; 135/100

(58) Field of Classification Search ...................... 47/17, 47/32.3, 20.1–31, 69, 19.1, 2; 135/87, 100
See application file for complete search history.

(56) References Cited

U.S. PATENT DOCUMENTS

| | | | | |
|---|---|---|---|---|
| 1,112,052 | A * | 9/1914 | Campbell | 47/20.1 |
| 1,161,380 | A * | 11/1915 | Denker | 47/31 |
| 1,198,178 | A * | 9/1916 | Bauer | 47/29.6 |
| 1,244,576 | A | 10/1917 | Arnold | |
| 1,392,178 | A * | 9/1921 | Kuebler | 47/29.3 |
| 1,415,482 | A * | 5/1922 | Reed | 135/100 |
| 1,600,749 | A * | 9/1926 | Barnes | 47/23.2 |
| 2,005,326 | A | 6/1935 | Schindler | 93/1 |
| 2,009,867 | A * | 7/1935 | Ball | 47/44 |
| 2,141,484 | A | 12/1938 | Piglia | 47/28 |

(Continued)

FOREIGN PATENT DOCUMENTS

| | | |
|---|---|---|
| DE | 3214674 | 10/1983 |
| GB | 11226 | 4/1902 |
| GB | 17031 | 5/1906 |

(Continued)

OTHER PUBLICATIONS

Green, Tek, "Shade Rite Quality Knitted Sahde Cloth," prior to Oct. 2005, 2 pages.

(Continued)

*Primary Examiner*—Andrea M Valenti
(74) *Attorney, Agent, or Firm*—Walter W. Duft

(57) ABSTRACT

A plant protector includes a flexible cover having an apex, a base, plural sides and plural vertices defining intersections between adjacent sides, together with plural elongated frame members each respectively attached to the cover at one of the vertices. The frame members each have a first end proximate to the cover apex and a second end proximate to the cover base. The frame member first ends are mutually interconnected for pivoting at or below the cover apex. The pivotal interconnection may be provided by hinge connector hardware, but is more preferably provided by the cover itself functioning as a living hinge. The frame members are pivotable from an open position wherein the frame members are angled relative to each other to a collapsed position wherein the frame members are substantially parallel to each other. The plant protector has a deployment configuration wherein the frame members are in the open position members and the cover base is substantially open to define a plant-receiving interior region. The plant protector also has a stowage configuration wherein the frame members are in the collapsed position and the cover base and the plant-receiving interior region are substantially closed. Plural connectors are provided for securing the plant protector to a surface.

12 Claims, 4 Drawing Sheets

U.S. PATENT DOCUMENTS

| | | | | |
|---|---|---|---|---|
| 2,143,257 | A | * | 1/1939 | Bessac .................. 47/29.3 |
| 2,302,650 | A | * | 11/1942 | Verne et al. ............. 135/130 |
| 2,808,844 | A | * | 10/1957 | Powers .................. 135/99 |
| 2,876,872 | A | * | 3/1959 | Roberts .................. 52/108 |
| 3,176,698 | A | * | 4/1965 | Warner .................. 135/100 |
| 3,214,865 | A | | 11/1965 | Rosenvold et al. ......... 47/29 |
| 3,384,992 | A | | 5/1968 | Heffron .................. 47/29 |
| 4,569,153 | A | | 2/1986 | Szilagyi .................. 47/58 |
| 4,665,645 | A | | 5/1987 | Schau, III et al. ......... 47/25 |
| D298,904 | S | | 12/1988 | Mourich et al. ............ D8/1 |
| 4,922,653 | A | | 5/1990 | Stone .................... 47/45 |
| 5,067,505 | A | * | 11/1991 | Cantwell et al. ........... 135/125 |
| 5,263,278 | A | | 11/1993 | Valenti, Jr. .............. 47/48.5 |
| 5,426,887 | A | | 6/1995 | Spencer et al. ............ 47/21 |
| D366,401 | S | | 1/1996 | Smith .................... D8/1 |
| 5,509,229 | A | | 4/1996 | Thomasson et al. ......... 47/21 |
| D399,713 | S | | 10/1998 | Allen et al. .............. D8/1 |
| 6,311,427 | B1 | | 11/2001 | McNally ................. 47/29 |
| 7,185,666 | B2 | * | 3/2007 | Chai ..................... 135/135 |

FOREIGN PATENT DOCUMENTS

| | | | |
|---|---|---|---|
| GB | | 2174281 A | * 11/1986 |
| GB | | 2258797 | 2/1993 |
| WO | WO93/20684 | | 10/1993 |
| WO | WO03/096791 | | 11/2003 |

OTHER PUBLICATIONS

Baycor, "Fencing Fabrics, Woven Recreational Fabrics," Oct. 2005, 2 pages.

* cited by examiner

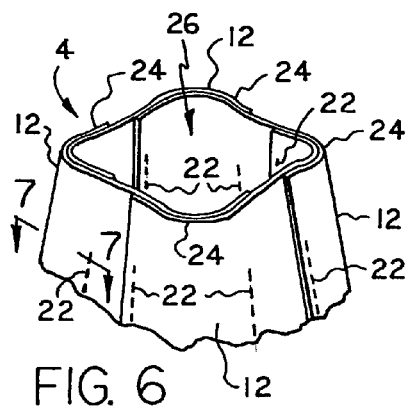
FIG. 6
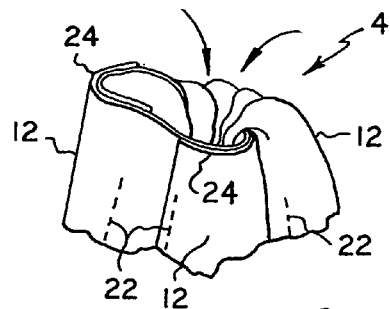
FIG. 8
FIG. 10B
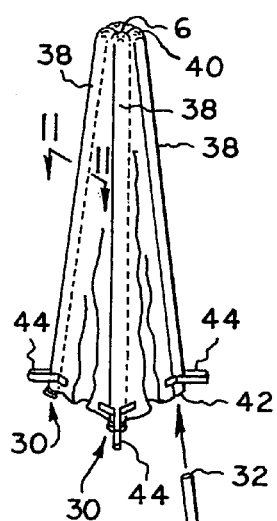
FIG. 10
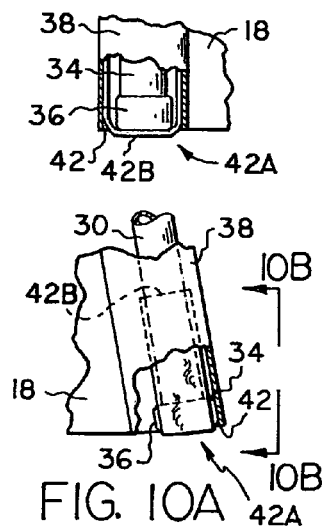
FIG. 10A
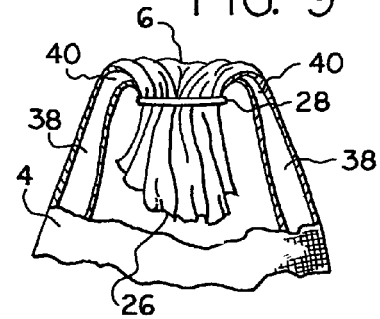
FIG. 9
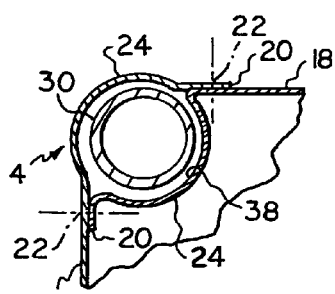
FIG. 11
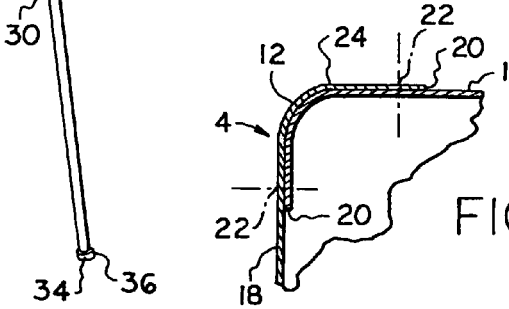
FIG. 7

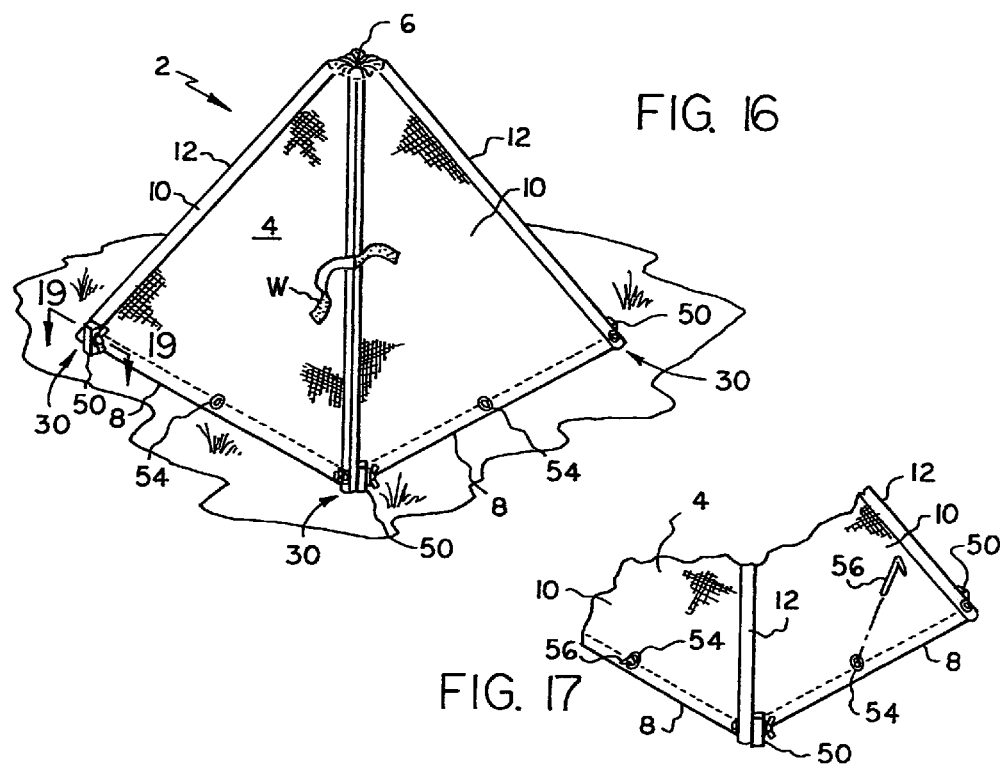
FIG. 16
FIG. 17
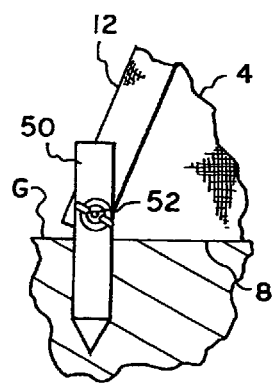
FIG. 18A
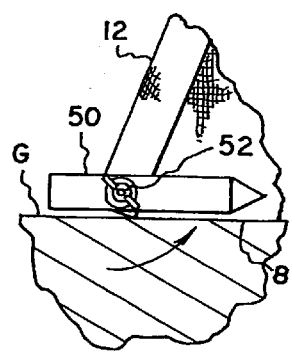
FIG. 18B
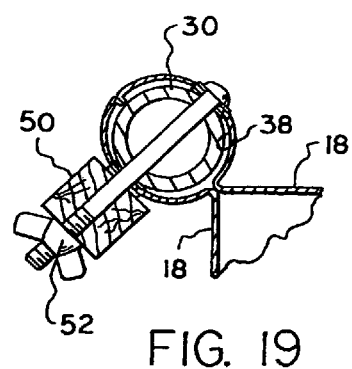
FIG. 19

STOWABLE PLANT PROTECTOR

BACKGROUND OF THE INVENTION

1. Field of the Invention

The present invention relates generally to plant protection. More particularly, the invention concerns protective coverings for shrubs, small trees and other plant specimens.

2. Description of Prior Art

By way of background, plants such as shrubs, young trees, ornamental plants and the like are often exposed during winter months to harsh environmental conditions that can damage and even kill the vegetation. Typical injuries include limb breakage due to snow and ice loads, browning and die-back from frigid desiccating winds, bark girdling and leaf stripping caused by browsing deer, rabbits and mice, and frost damage. To counteract these effects, it is common practice to wrap sensitive species with a burlap covering in the fall, and thereafter remove the cover in the spring. Although this technique represents an effective solution to plant protection, there are several drawbacks, including (1) the need to dispose of the burlap at the end of the season (due to rotting and UV degradation), (2) the difficulty associated with cutting the burlap to size, wrapping the plant, and then securing the covering with string or twine, (3) the care required to avoid wrapping the burlap too tightly or too loosely, the former giving rise to heat generation and desiccation of living foliage, the latter allowing burlap to unravel in high winds or permit foraging deer to pull off the burlap, and (4) the need to wrap exposed trunk areas in order to protect against road salt for plants situated next to roadways and walkways. Burlap plant wrappings, moreover, are not particularly attractive to passersby.

It is to improvements in the area of plant protection that the present invention is directed. In particular, what is needed is a plant protector that overcomes the above-mentioned deficiencies associated with the conventional burlap wrapping technique.

SUMMARY OF THE INVENTION

The foregoing problems are solved and an advance in the art is provided by a novel plant protector that includes a flexible cover having an apex, a base, plural sides and plural vertices defining intersections between adjacent sides, together with plural elongated frame members each respectively attached to the cover at one of the vertices. The frame members each have a first end proximate to the cover apex and a second end proximate to the cover base. The frame member first ends are mutually interconnected for pivoting at or below the cover apex so as to be hidden from view. The pivotal interconnection may be provided by hinge connector hardware, but is more preferably provided by the cover itself functioning as a living hinge. The frame members are pivotable from an open position wherein the frame members are angled relative to each other to a collapsed position wherein the frame members are substantially parallel to each other. The plant protector has a deployment configuration wherein the frame members are in the open position members and the cover base is substantially open to define a plant-receiving interior region. The plant protector also has a stowage configuration wherein the frame members are in the collapsed position and the cover base and the plant-receiving interior region are substantially closed. Plural connectors are provided for securing the plant protector to a surface.

According to exemplary embodiments of the plant protector, the cover may be constructed from a suitable fabric material. The cover may have various configurations, but is most preferably shaped as a pyramid with four sides, four vertices and a substantially square base (when the cover is in its deployment position). The frame members may be attached to the cover by way of sleeves formed on the vertices of the cover. The sleeves may extend continuously from a first end thereof proximate to the cover apex to a second end thereof proximate to the cover base. The sleeves are preferably open at their second end in order to receive the frame members therein, but may include ledges that support the frame member second ends to retain the frame members in the sleeves. The sleeves are preferably closed at their first end in order to trap the frame member first ends. The sleeve closures can be provided by virtue of a terminal portion of the cover being folded inwardly to extend into the plant-receiving interior. The terminal cover portion can be maintained in the folded position by way of a suitable fastener, such as a tie. The connectors can be implemented as stake-receiving loops proximate to the cover base. Such loops can be formed at the cover vertices and at the cover sides. Alternatively, the connectors may comprise stakes that are pivotally mounted to the frame members.

To use the plant protector, the frame members are opened to the deployment configuration and the plant protector is placed over a plant to be protected. The plant protector is staked to the ground at the connectors. When protection is no longer required, the stakes are removed from the ground, the plant protector is lifted from the plant, and the frame members are collapsed to the stowage configuration. A wrapping can be used to secure the plant protector in the stowage configuration until subsequent use.

BRIEF DESCRIPTION OF THE DRAWINGS

The foregoing and other features and advantages of the invention will be apparent from the following more particular description of exemplary embodiments of the invention, as illustrated in the accompanying Drawings in which:

FIG. 6 is an enlarged view of the plant protector of FIG. 1 showing an upper terminal portion of the plant protector cover prior to closure thereof;

FIG. 7 is a cross-sectional view taken along line 7-7 in FIG. 6 to illustrate a joining technique for joining the panels of FIG. 5 to form the cover of the plant protector of FIG. 1;

FIG. 8 is an enlarged view of the plant protector of FIG. 1 showing the upper terminal portion of the plant protector cover during the closure thereof;

FIG. 9 is a fragmentary side view of the plant protector of FIG. 1 with a portion broken away to show the upper terminal portion of the plant protector cover folded into the plant protector interior region;

FIG. 10 is a perspective view of the plant protector of FIG. 1 showing the plant protector cover receiving a frame member;

FIG. 10A is a detailed side view of a frame member being captured by a ledge at the bottom of a frame member receiving sleeve formed in the plant protector cover;

FIG. 10B is a detailed side view looking in the direction of line 10B-10B in FIG. 10A;

FIG. 11 is a cross-sectional view taken along line 11-11 in FIG. 10 showing a frame member situated in a frame member receiving sleeve formed in the plant protector cover;

FIG. 16 is a perspective view of a plant protector constructed in accordance with a second exemplary embodiment of the invention;

FIG. 17 is a fragmentary perspective view of the plant protector of FIG. 12 undergoing optional additional staking;

FIG. 18A is an enlarged fragmentary side view of the plant protector of FIG. 16 showing an pivotally attached stake disposed in a staking position;

FIG. 18B is an enlarged fragmentary side view of the plant protector of FIG. 16 showing the pivotally attached stake disposed in an non-staking position; and FIG. 19 is a cross-sectional view taken along line 19-19 in FIG. 16 showing a stake pivotally attached to a frame member.

DETAILED DESCRIPTION OF PREFERRED EMBODIMENTS

Figure 1:
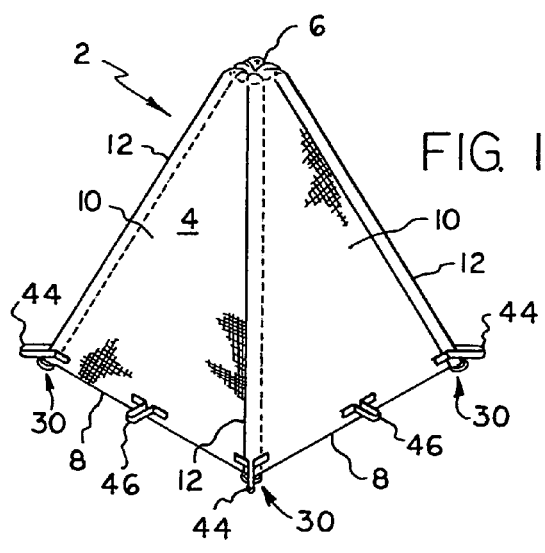
FIG. 1 is a perspective view of a plant protector constructed in accordance with a first exemplary embodiment of the invention.
Figure 2:
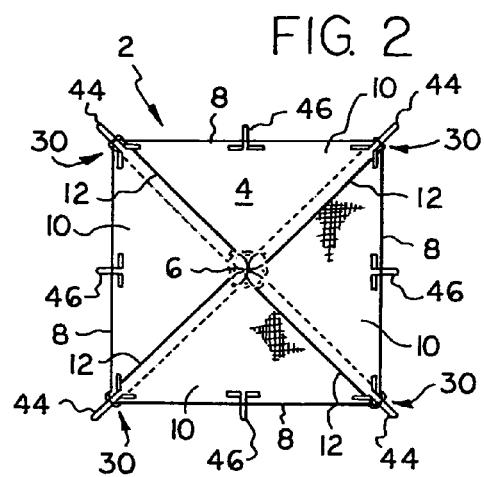
FIG. 2 is a top plan view of the plant protector of FIG. 1.
Figure 3:
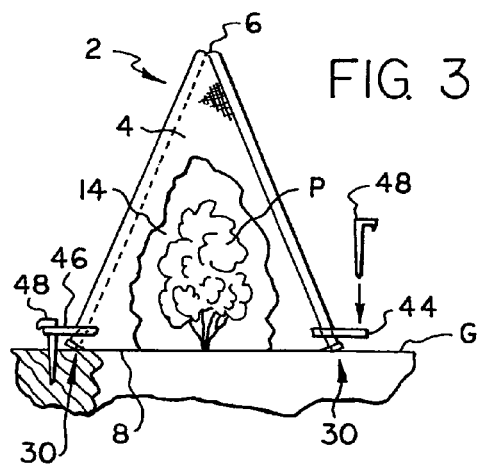
FIG. 3 is a side elevation view of the plant protector of FIG. 1 with a portion of the plant protector cover broken away for clarity to illustrate a plant disposed within the plant protector interior region.

Turning now to the Drawings, wherein like reference numerals signify like elements in all of the several views, FIGS. 1-3 illustrate a plant protector 2 constructed in accordance with a first exemplary embodiment of the invention. The plant protector 2 includes a cover 4 formed from a flexible material sheet that is preferably air permeable and light transmissive. High density polyethylene fabric (HDPE) is one material that may be used to construct the cover 4. Polypropylene fabric is another material that may be used. The cover 4 may have any suitable transmissivity level, depending on prevailing climate conditions and the plant species to be protected. By way of example only, an HDPE fabric sold under the name "SHADE RITE" is available from Green-Tek, Inc. of Edgerton, Wis. (www.green-tek.com) with shade factors ranging from 30% to 90%. Another shade fabric available from Green-Tek, Inc. is sold under the name "ALUMINET." This material comprises HDPE with a metalized coating that reflects UV light. If the plant protector 2 is to be used for temporary overnight frost protection, the cover 4 can be made from this material due to its ability to inhibit radiational cooling. Other materials may also be used.

The cover 4 has an apex 6, a base 8, plural sides 10 and plural vertices 12 defining intersections between adjacent pairs of the sides. Depending on the number of sides 10 and vertices 12 that are selected, the cover can be formed with any of a variety of configurations. FIGS. 1-3 illustrate a four-sided pyramid configuration with four sides 10, four vertices 12, and a substantially square base 8. In an alternative configuration, the cover 4 could be implemented as a three-sided pyramid with three sides 10, three vertices 12 and a substantially triangular base 8. Other configurations (e.g., with more than four sides) could potentially also be used. Note that a pyramidal shape, coupled with the use of a cover material that is green in color, provides a pleasing visual effect in which the plant protector 2 has the appearance of an evergreen tree.

Figure 4:
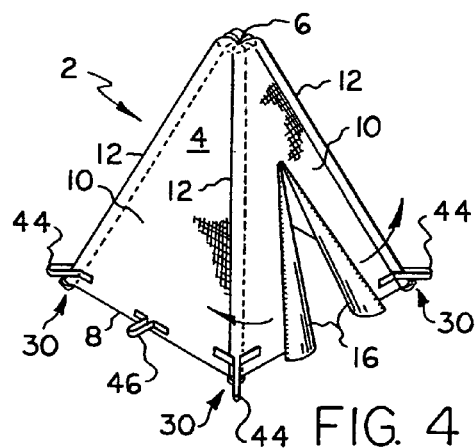
FIG. 4 is a perspective view of a modified version of the plant protector of FIG. 1 in which an optional slit opening is provided in the plant protector cover.

As shown in FIG. 3, the cover 4 defines a plant-receiving interior region 14 for covering a plant P growing above the ground G. Because plants vary in height and width, the plant protector 2 can be manufactured in different sizes. By way of example only, the plant protector could be manufactured in small, medium and large versions, with the small version having an exemplary apex height of three feet, the medium version having an exemplary apex height of six feet, and the large version having an exemplary apex height of nine feet. The plant protector 2 will in most cases be installed by lowering it over the plant P and securing the base 8 of the cover 4 to the ground G. However, this may be difficult for large plants greater than 6 feet in height because the average person will not be able to lift the plant protector 2 high enough without the use of a ladder. As shown in FIG. 4, the plant protector 2 can be modified for use with large plants P by forming a closable slit opening 16 in one of the sides 10 of the cover 4. Although not shown, closure of the slit opening 16 could effected by way of any suitable fastening device, such as a zipper, buttons, snaps, ties, etc., mounted along the flap edges. The plant protector 2 can then be installed by wrapping the cover 4 around the plant P, then closing the slit opening 16, fastening the closure, and securing the base 8 to the ground G. The slit opening 16 can be of any suitable length. By way of example only, a six-foot long slit opening 16 could be provided in a nine-foot plant protector 2.

Figure 5:
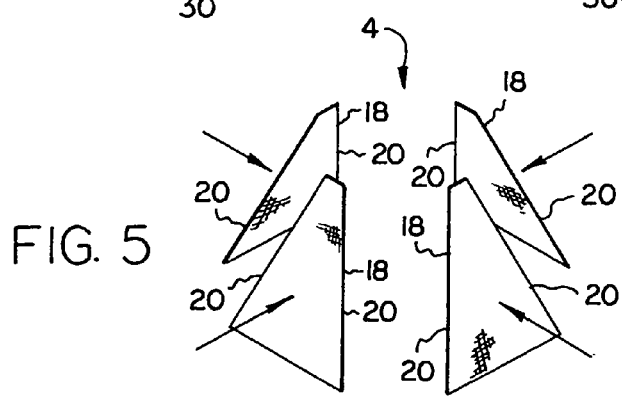
FIG. 5 is an exploded view showing panels that may be used construct the cover of the plant protector of FIG. 1.
Figure 11A:
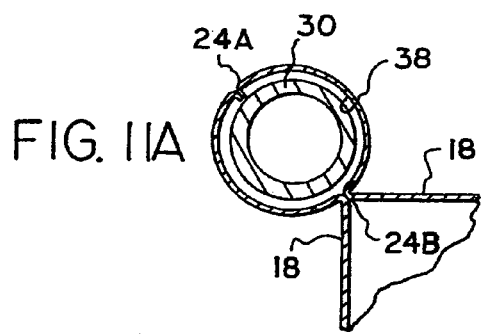
FIG. 11A is a cross-sectional view taken along line 11-11 in FIG. 10 showing a frame member received in an alternatively-constructed sleeve formed in the plant protector cover.

As shown in FIGS. 5-7, one way that the plant protector 2 can be manufactured is to form the cover 4 by joining together individual panels 18, as by sewing or the like. As further illustrated in FIG. 7, this can be done by overlapping the edges 20 of adjacent panels 18 and applying spaced-apart parallel rows of stitching 22 to form seams 24 that create the vertices 12. As will be described in more detail below, this construction facilitates the formation of sleeves for receiving frame members that structurally support the cover 4. It will be appreciated that the panels 18 could also be joined together without the wide overlapping seams 24. In that case, the sleeves can be formed using an alternative construction, as shown in FIG. 11A and described in more detail below. Once the panels 18 are joined together, the cover 4 will be substantially complete, but will have an open terminal portion 26 at its upper end. If desired, the terminal portion 26 can be left open as shown in FIG. 6, in which case the cover 4 will be open at its apex 6. Alternatively, the terminal portion 26 can be closed, in which case the cover 4 will have a closed apex 6. One way that the terminal portion 26 can be closed is to fold it inwardly into the interior region 14, as shown in FIGS. 8 and 9. The terminal portion 26 can be maintained in the folded position by securing it with any suitable fastener arrangement, such as the cable tie 28 shown in FIG. 9. It will be appreciated that the terminal portion 26 could be closed using other techniques, such as sewing or clamping it together without folding it into the interior region 14.

As shown in FIGS. 10 and 11, the plant protector 2 additionally includes plural elongated frame members 30 that are each respectively attached to the cover 4 at one of the vertices 12. The frame members 30 can be constructed as linearly extending (i.e., straight) tubes made any suitably rigid material, such as powder coated metal (e.g., 20 gauge, ¾ O.D.

steel pipe), polyvinyl chloride (PVC) tubing, etc. If desired, the frame members 30 can be of segmented construction, as by forming two, three or more metal pipe or tube segments with swaged tips (e.g. two inches long) that can be inserted into the base end of another tube segment to create a length of interconnected segments. It will be appreciated that a segmented frame member construction will facilitate the shipping of plant protectors 2 of different size in the same size box (or other packaging container). For example, three-foot, six-foot and nine-foot plant protectors 2 could be all be shipped in boxes of uniform size by designing the frame members 30 using three segments that are each the same size (e.g., approximately forty-two inches in length where the vertices 12 are oriented at sixty degrees). The three-foot plant protector 2 would require one segment for each frame member 30, the six-foot plant protector would require two segments for each frame member, and the nine-foot plant protector would require three segments for each frame member.

As can be seen in FIG. 10, each frame member 30 has a first end 32 proximate to the cover apex 6 and a second end 34 proximate to the cover base 8. If desired, protective cap members 36 made from plastic or the like can be mounted to the second end 34 of each frame member 30. The frame members 30 can be attached to the cover 4 by inserting them into sleeves 38 that run along the vertices 12. As shown in FIG. 11, one way that the sleeves 38 can be formed is to separate the overlapping edges of adjacent cover panels 18 where the seams 24 are formed by the parallel rows of stitching 22. FIG. 11A illustrates an alternative technique for creating the sleeves 38 wherein the panels 18 are joined using a different construction than that shown in FIGS. 7 and 11. In FIG. 11A, adjacent edges of the panels 18 are joined at small seams 24A that are formed by sewing or the like. The sleeves 38 are then created by gathering the cover material and forming secondary seams 24B spaced inwardly from the seams 24A. The secondary seams 24B may be continuous or noncontinuous.

When the sleeves 38 are constructed according to either of the above-described techniques, they will extend from a first end 40 thereof that is spaced from or proximate to the cover apex 6 (see FIG. 9) to a second end 42 thereof that is proximate to the cover base 8 (see FIG. 10). The reason why it may be desirable space the first end 40 of the sleeves 38 from the cover apex 6 (e.g. approximately six inches) is when the sleeve construction of FIG. 11A is used, and the terminal portion 26 would be pinched off if the stitching 24B extended all the way to the apex, thereby inhibiting the inward folding of the terminal portion shown in FIGS. 8 and 9. It will be appreciated that the sleeves could also be constructed in other ways, such as by securing a series of loop members to the inside surface of the vertices 12. Preferably, the sleeves 38 will be left open at their second end 42 to allow the frame members 30 to be inserted into the sleeves. However, as shown in FIGS. 10A and 10B, the second end 42 of each sleeve 38 is preferably partially closed in order to provide a ledge 42A that supports the second end 34 of a frame member 30. The ledge 42A can be formed by stitching a U-shaped material strip 42B (made from nylon fabric or the like) to the sides of the sleeve 38, such that the bottom of the "U" defines the ledge. The width of the ledge 42A is selected to match the size of the frame member protective caps 36. The sleeve second end 42 must then be larger than the width of the ledge 42A in order to admit the associated frame member 30. During insertion, the frame member 30 will be pushed into the sleeve 38 until the protective cap 36 is adjacent to the ledge 42A. The frame member second end 34 can then be manipulated laterally until it rests on top of the ledge 42A. It will be appreciated that the ledge 42A can be formed in other ways, such as by partially stitching the sleeve second end 42 to form a partial closure.

Figure 12:
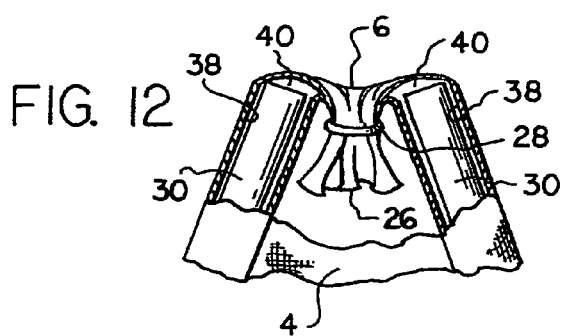
FIG. 12 is a fragmentary side view of the plant protector of FIG. 1 with a portion broken away to show the frame members received at the upper end of the sleeves.

In contrast to the second ends 42 of the sleeve 38, the sleeve first ends 40 are preferably fully closed in order to trap the frame member first ends 32. In the cover construction shown FIG. 9, the sleeve first ends 40 are closed by virtue of the terminal portion 26 of the cover 4 being folded inwardly. The sleeve first ends 40 could also be closed by other means, such as sewing or using fasteners. As shown in FIG. 12, after the frame members 30 are fully inserted into the sleeves 38, the frame member first ends 32 will be captured by the closed first ends 40 of the sleeves. The cover 4 will provide a flexible interconnection between the frame member first ends 32 that functions as a living hinge to facilitate pivotal movement of the frame members 30 relative to each other. In this way, pivotal coupling hardware will not be required to pivotally interconnect the frame members 30, thereby reducing material costs. In the event that pivotal coupling hardware is desired, it may still be used, but such hardware will preferably be situated below the apex 6 so as to be hidden from view and to allow closure of the apex to provide increased plant protection.

Figure 13:
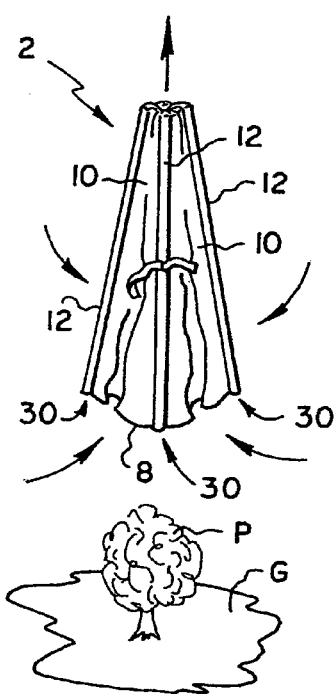
FIG. 13 is a perspective view showing the removal of the plant protector of FIG. 1 from a plant.
Figure 14:
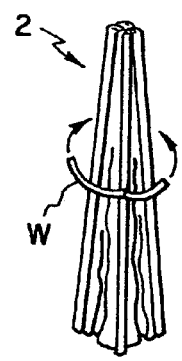
FIG. 14 is a perspective view of the plant protector of FIG. 1 following collapse thereof for stowage and during securement via a wrapping.
Figure 15:
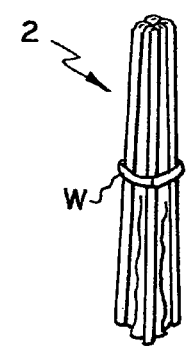
FIG. 15 is a perspective view of the plant protector of FIG. 1 following securement via the wrapping.

The frame members 30 are pivotable from the open position wherein the frame members are angled relative to each other, to the collapsed position wherein the frame members are substantially parallel to each other. This pivoting capability of the frame members 30 allows to the plant protector 2 to be selectively placed in a deployment configuration and in a stowage configuration. FIGS. 1-4 illustrate the deployment configuration. Here, the frame members 30 are pivoted to their open position and the base 8 is substantially open to define the plant-receiving interior region 14. FIGS. 13-15 illustrate the stowage configuration. Here, the frame members 30 are pivoted to their collapsed position and the base 8 and the interior region 14 are substantially closed. A wrapping member W, which may be constructed either with two wrapping elements affixed to the cover 4, or provided separately therefrom as a single wrapping element, can be used to bind the plant protector 2 in the stowage configuration. A hook and loop locking mechanism may be provided on the wrapping member W to facilitate its securement.

The plant protector 2 is additionally provided with plural connectors for securing the structure to the ground G (or other surface) when the plant protector is deployed for use. FIGS. 1-4 illustrate one exemplary embodiment of the plant protector 2 wherein the connectors are stake-receiving loops 44 situated proximate to the base 8. The loops 44 can be made of nylon fabric or other strong material attached onto the cover 4. A primary set of loops 44 will be preferably provided at each of the vertices 12. A set of secondary loops 46 may also be provided on the cover sides 10 (e.g., midway between each vertice). The loops 44/46 can be constructed using strips of material that are looped and sewn to the desired locations on the cover 4. By way of example only, the primary loops 44 can be formed using four-inch lengths of one-inch wide material and the secondary loops 46 can be formed using two-inch lengths of one-inch wide material. As shown in FIG. 3, the loops 44/46 receive stakes 48 that are inserted into the ground G to secure the plant protector 2. The stakes can be made of rigid plastic or other suitable material and will be of sufficient length to properly anchor the plant protector 2 for all anticipated environmental conditions. For three-foot, six-foot and nine-foot plant protectors 2, fifteen inch stakes with friction-enhancing corrugations at the lower ends thereof have been found to provide more than adequate anchoring capability when inserted through the primary loops 44. Additional anchoring is achieved by staking the secondary loops 46. Staking these loops also helps prevent wind from entering the interior region 14 of the plant protector 2, and provides a barrier against nesting animals (e.g., rabbits).

An alternative technique for providing the plural connectors is shown in the second exemplary embodiment of FIGS. 16-19. Here, the connectors comprise stakes 50 made from wood or other suitable material that are pivotally mounted to each of the frame members 30. The stakes 50 can be mounted to the frame members 30 using wing nut fasteners 52 or any other suitable fastening technique, as best shown in FIG. 19. As shown in FIG. 18A, the stakes 50 can be pivoted to a first position wherein the stakes are oriented for entry into the ground G. As shown in FIG. 18B, the stakes 50 can be pivoted out of the first position when the plant protector 2 is not secured to the ground G. The plural connectors may further include grommets 54 formed around the base 8 (e.g., at the midpoint of each side 10). As shown in FIG. 17, the grommets 54 receive pin stakes 56 that may be used to secure the sides 10 of the plant protector 2 to the ground G. Again, such staking provides additional anchoring and also helps prevent wind and animal entry into the interior region 14 of the plant protector 2.

Accordingly, a plant protector for protecting shrubs, small trees, and other plant specimens has been shown and described. It will be appreciated from the foregoing discussion that the problems addressed by the invention have been accomplished. In particular, the plant protector provides superior plant protection against typical winter environmental conditions, while providing a product that is easy to setup and install, simple to collapse for summer storage, and which is reusable over many seasons. The ability of the plant protector to protect against excessive salt build-up in and around lower plant areas means that salt intolerant species can now be located near streets and walkways, thereby increasing the design choices available to gardeners. The "evergreen" shape of the design, coupled with the fact that there are no visible frame members, enhances product attractiveness. The ability to frame the plant protector without cumbersome pivotal coupling hardware also increases the product's cost effectiveness while reducing design complexity and maintenance requirements.

While various embodiments of the invention have been disclosed, it should be apparent that many variations and alternative embodiments could be implemented in accordance with the teachings set forth herein. It will therefore be understood that the invention is not to be in any way limited except in accordance with the spirit of the appended claims and their equivalents.

What is claimed is:

1. A plant protector, comprising:
   a cover formed from a flexible material sheet that is air permeable and light transmissive;
   said cover including an apex, a base, plural sides and plural vertices defining intersections between adjacent pairs of said sides;
   plural elongated rigid frame members each respectively attached to said cover at one of said vertices; wherein said frame members are attached to said cover by way of sleeves formed on said cover at said vertices;
   said frame members each having a first end proximate to said cover apex and a second end proximate to said cover base;
   said cover apex covering and interconnecting said frame member first ends for pivotal movement of said frame members relative to each other;
   said frame member first ends being interconnected solely by way of said cover apex; wherein said sleeves are closed at their first ends in order to trap said frame member first ends; wherein said sleeves are closed by virtue of a terminal portion of said cover being folded inwardly to extend into said plant-receiving interior below said frame member first ends and to define said cover apex where said terminal portion folds over said frame member first ends; wherein said terminal portion is maintained in said folded position by way of a fastener;
   said frame members being pivotable at said frame member first ends from an open position wherein said frame members and said cover vertices are angled relative to each other to a collapsed position wherein said frame members and said cover vertices are substantially parallel to each other;
   said plant protector having a deployment configuration wherein said frame members are in said open position and said cover base is substantially open to define a plant-receiving interior region;
   said plant protector having a stowage configuration wherein said frame members are in said collapsed position and said cover base and said plant-receiving interior region are substantially closed; and
   plural connectors for securing said plant protector to a surface.

2. A plant protector in accordance with claim 1, wherein said cover comprises a fabric material.

3. A plant protector in accordance with claim 1, wherein said cover comprises high density polyethylene.

4. A plant protector in accordance with claim 1, wherein said cover is configured as a pyramid with four sides, four vertices and a substantially square base when said cover is in said deployment position.

5. A plant protector in accordance with claim 1, wherein said sleeves extend from a first end thereof proximate to or spaced from said cover apex to a second end thereof proximate to said cover base.

6. A plant protector in accordance with claim 5, wherein said sleeves are open at their second ends in order to receive said frame members.

7. A plant protector in accordance with claim 6, wherein said sleeves are formed with a ledge at their second ends in order to retain said frame member second ends.

8. A plant protector in accordance with claim 1, wherein fastener comprises a tie.

9. A plant protector in accordance with claim 1, wherein said connectors comprise stake-receiving loops proximate to said cover base.

10. A plant protector in accordance with claim 9, wherein said loops are formed at said cover vertices and at said cover sides.

11. A plant protector in accordance with claim 1, wherein said connectors comprise stakes pivotally mounted to said frame members.

12. A plant protector, comprising:
    a cover formed from a flexible fabric sheet material comprising high density polyethylene that is air permeable and light transmissive;
    said cover having a generally pyramidal configuration that includes an apex, a square base, four sides and four vertices defining intersections between adjacent pairs of said sides;
    plural elongated frame members each respectively attached to said cover at one of said vertices by way of sleeves extending continuously along said vertices from a first end thereof proximate to said cover apex to a second end thereof proximate to said cover base;

said sleeves being open at their second ends in order to receive said frame members;

said sleeves having ledges at their second ends in order to retain said frame member second ends;

said sleeves being closed at their first ends in order to trap said frame member first ends;

said sleeves being closed by virtue of a terminal portion of said cover being folded inwardly to extend into said plant-receiving interior below a first end of said frame members that is proximate to said apex;

said terminal portion being maintained in said folded position;

said frame members each having said first end proximate to said cover apex and a second end proximate to said cover base;

said cover apex covering interconnecting said frame member first ends for pivotal movement of said frame members relative to each other; said frame member first ends being interconnected solely by way of said cover apex;

said frame members being pivotable from an open position wherein said frame members are angled relative to each other to a collapsed position wherein said frame members are substantially parallel to each other;

said plant protector having a deployment configuration wherein said frame members are in said open position members and said cover base is substantially open to define a plant-receiving interior region;

said plant protector having a stowage configuration wherein said frame members are in said collapsed position and said cover base and said plant-receiving interior region are substantially closed; and plural connectors for securing said plant protector to a surface, said connectors comprising stake-receiving loops proximate to said cover base and formed at said cover vertices and said cover sides.

* * * * *